United States Patent Office 3,565,775
Patented Feb. 23, 1971

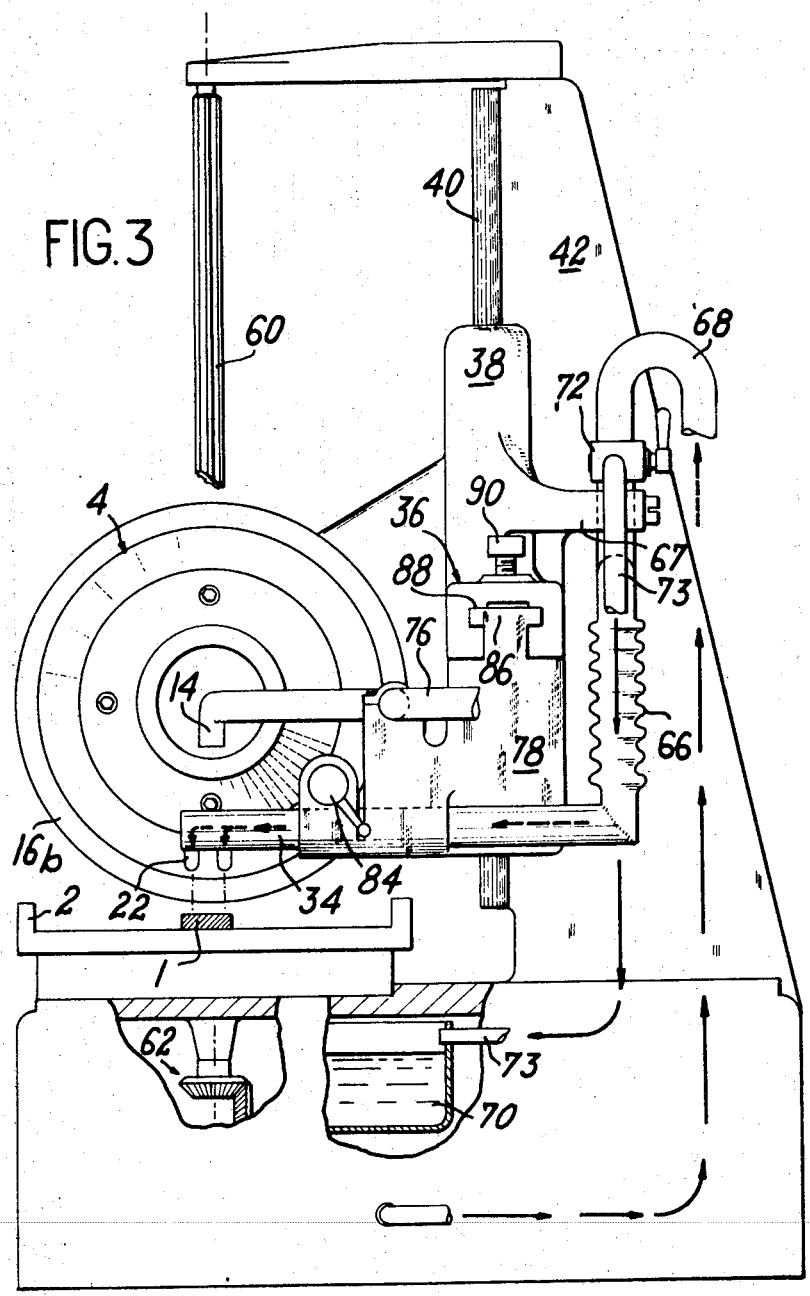

3,565,775
METHOD AND DEVICE FOR ELECTROLYTIC CUTTING
Paulette Bouchet, Paris, and René Chazot, Groslay, France, assignors to Commissariat a l'Energie Atomique, Paris, France
Filed Apr. 2, 1968, Ser. No. 718,068
Claims priority, application France, Apr. 7, 1967, 101,992
Int. Cl. C23b 3/04
U.S. Cl. 204—143  9 Claims

ABSTRACT OF THE DISCLOSURE

The invention concerns electrolytic cutting of a metal part. An electrolyte is poured to the part through a narrow passageway to which is imparted an oscillation motion parallel to the cut and a protective liquid film is formed on each side of the electrolyte flow for limiting the lateral cutting action of the electrolyte whilst an electric current passes through it between the part and the passageway.

Figure 1:
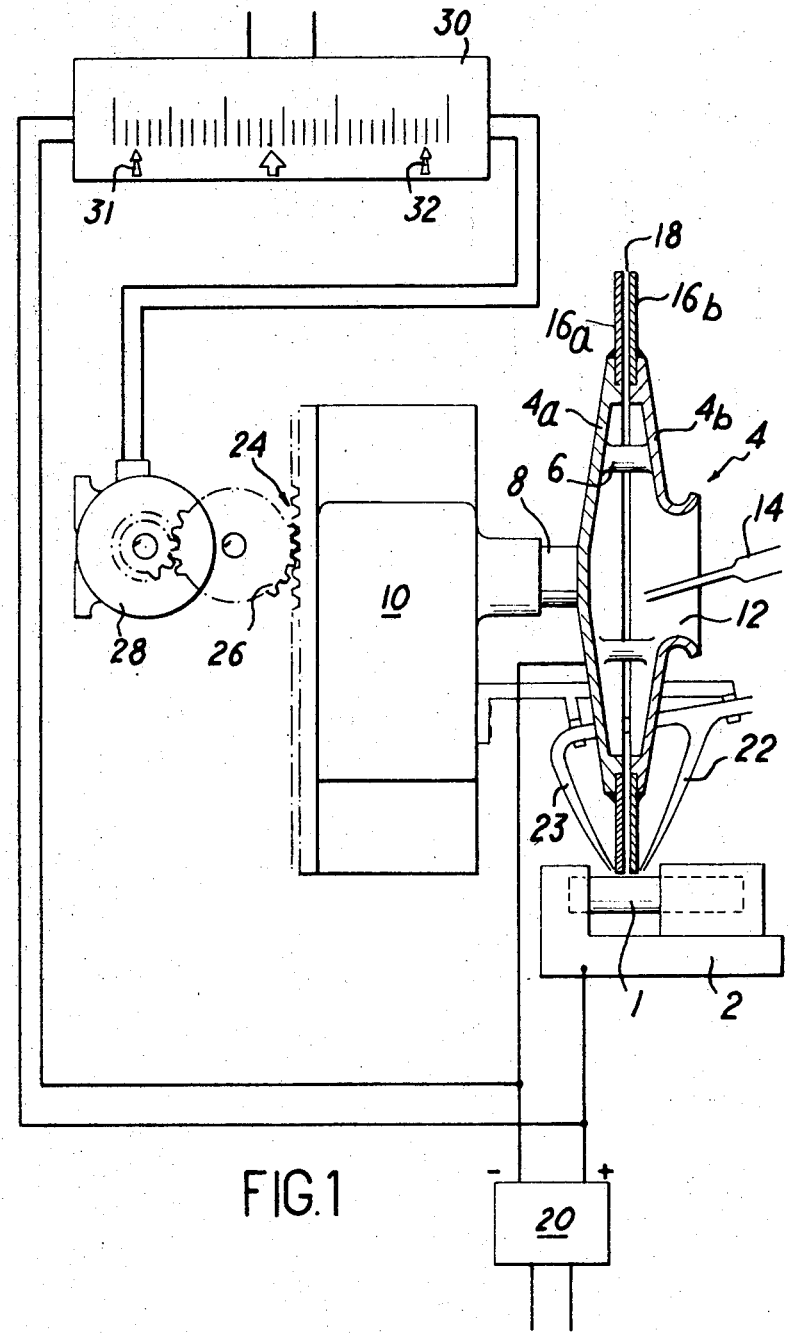

The passageway is formed by two flat circular discs parallel to the cut and fixed on a oscillating hub. This passageway and the nozzles are translated relating to the part to keep constant their distance to the cut.

---

This invention is concerned with a method and device for cutting metals.

Cutting of metals can usually be carried out either chemically or electrolytically or alternatively by electro-erosion. However, in the case of some metals such as uranium, the known methods are not suited to the purpose. In point of fact, cutting by electro-erosion results in fairly marked local work-hardening, whereas chemical cutting operations are either too time-consuming or produce widths of cut which are excessive and, in many cases, irregular.

The obect of this invention is to overcome these disadvantages by making it possible, especially in the case of metals which are difficult to machine such as uranium, to obtain a uniform cut in a reasonably short time.

This invention is directed to a method of electrolytic cutting which consists both in continuously pouring an electrolyte through a narrow channel, in passing an electric current between said passageway and the part to be cut through said electrolyte, and in pouring on each side of said passageway a protective liquid which is immiscible with the electrolyte and forms a film for limiting the cutting action in the lateral direction, and in imparting to said passageway a movement of oscillation above the cut.

The invention also extends to an electrolytic cutting device comprising a support for the part to be cut, above said support a member for guiding an electrolyte which is poured in the direction of said part and an electric circuit providing a connection between said part and said member through the electrolyte, characterized in that it comprises a flat circular passageway which is parallel to the cut to be made, the periphery of said passageway being open whilst the central portion thereof is connected to a pipe for the continuous admission of an electrolyte which flows towards the part to be cut, nozzles through which a lateral protection liquid flows continuously in the direction of the part and which are mounted on each side of the passageway, and means for regulating the distance between said passageway and nozzles and the part progressively as said part is attacked by the electrolyte.

According to another characteristic feature, said device comprises a motor for producing the oscillating motion of the passageway alternately in one direction, then in the other and parallel to the cut being made in the part.

According to another characteristic feature, the passageway is constituted by two flat rings fixed in parallel relation at a small distance from each other on a hollow hub which is connected to a rotary drive motor and provided at its center with an opening for the introduction of electrolyte.

The uniform flow of the protective liquid which is preferably oil on each side of the passageway for the admission of electrolyte prevents said electrolyte from spreading beyond the width which is strictly necessary for cutting and thus permits said width to remain constant and uniform.

Moreover, the oscillating motion of the passageway for the admission of electrolyte which is preferably an acid permits the renewal of said acid as well as the wall of said passageway and prevents any attacking action by said electrolyte and any deposition on the walls of the passageway which would result in irregular cutting.

Any excessive work-hardening and local heating processes are eliminated as a result of electrolytic cutting.

Figure 2:
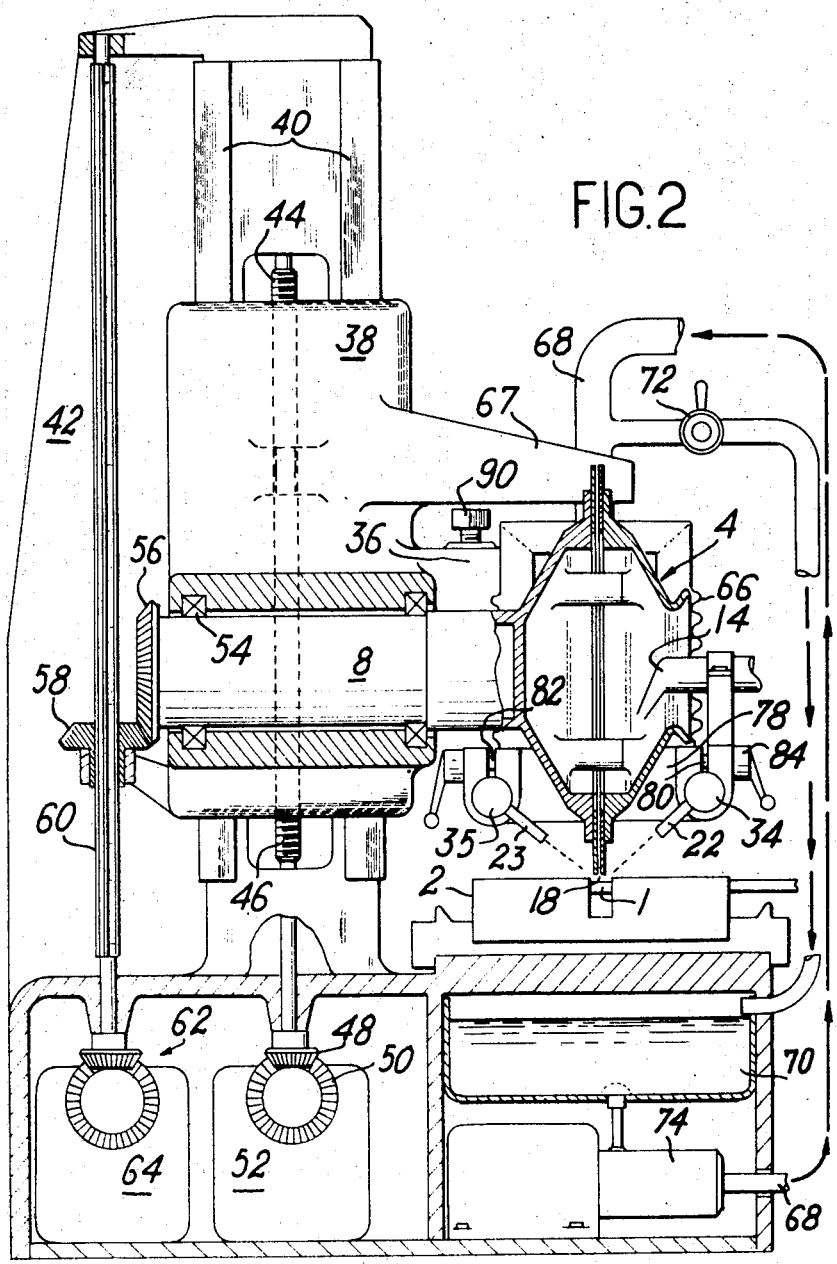

A number of other properties and advantages of the invention will in any case become apparent from the following description of one embodiment which is given by way of non-limitative example and illustrated in the accompanying drawings, in which:

FIG. 1 is a diagrammatic view of an electrolytic cutting device;
FIG. 2 is a longitudinal sectional view of an alternate embodiment of said device;
FIG. 3 is a side view of the device of FIG. 2.

As shown in FIG. 1, the part 1 to be cut is fixed on a horizontal support 2 beneath a hollow hub 4 formed by two discs 4a, 4b of substantially frusto-conical cross-section which are joined together by spacer members 6, one disc 4a being fixed at its center on the shaft 8 of a motor 10 for driving said hub in rotation alternately in one direction, then in the other.

The second disc 4b is pierced at its center by an orifice 12. A pipe 14, which is connected to a system for the supply of electrolyte (not shown in the drawings), is adapted to penetrate through said orifice practically to the center of the hub 4 so as to permit the flow of electrolyte between the two discs 4a and 4b.

There is fixed on each disc a circular ring 16a, 16b which is fabricated, for example, from stainless steel. These two rings 16a, 16b are set at a small distance apart and thus form between them a flat annular passageway 18 which is open on the one hand at its periphery towards the exterior and, on the other hand in the central portion thereof towards the interior of the disc 4. Said passageway 18 permits the flow of electrolyte which is supplied through the pipe 14 solely under gravity in the direction of the part 1 to be cut.

The dimensions of said passageway are nevertheless sufficiently small to ensure that the electrolyte is retained by capillarity and forms by degrees a droplet which spreads out in contact with the metal and establishes an electrical contact between the rings 16a, 16b and the part 1 to be cut. In addition, said rings and said part are connected to the input and output of a variable-voltage direct-current generator 20 which constitutes respectively the negative and positive poles of this circuit.

When current is passed through the part 1 to be cut, the electrolyte which is preferably an acid accordingly acts on said part by chemical attack and carries the dissolved salts towards the rings 16.

However, said attacking action by the acid on said part 1 is limited by a relatively abundant flow of protective liquid supplied through two nozzles 22, 23 which open in proximity to the part to be cut on each side of the passageway 18. The protective liquid, which is immiscible with the electrolyte and has a lower density than this latter, and which is preferably oil, forms in fact on each side of the passageway 18 a film which prevents spreading of the acid or, if necessary, displaces any portions of the acid which might move away from the cutting line so as to prevent them from producing any action on the part.

The width of cut is thus maintained strictly the same throughout the cutting operation.

Furthermore, the rotation of the hub 4 and of the passageway 18 take place at a relatively low speed—between 20 and 100 r.p.m. approximately—whilst the direction of rotation is reversed approximately every fifteen seconds. As a consequence, the passageway wall which serves for the electrolytic process is almost continuously renewed as is the case with the acid which is supplied through said passageway. Any danger of irregularities arising from deposits formed on the passageway walls or from electro-chemical attack by the acid is thus removed.

The cutting operation can thus be carried out in a wholly uniform and continuous manner; the action of the acid remains effective; and the current is permitted to pass in a uniform manner between the two electrodes constituted by the rings 16a and 16b and the part 1 to be cut.

Similarly, any local heating is prevented both by the rotation of the passageway and by a suitable adjustment of the voltage of the generator 20.

The support 2 of the part 1 is preferably stationary whilst the hub 4 and its motor 10 are capable of vertical displacement. The part 1 is then positioned on its support, whereupon the hub 4 is lowered until an electrical contact can be established between the rings 16 and said part by means of the electrolyte which flows through the passageway 18.

As the cutting operation proceeds, said electrical contact is maintained by means of a progressive displacement of the passageway 18 in the direction of the part 1. Said displacement can be carried out by means of any suitable system but is preferably controlled in dependence on the voltage developed between the electrodes or on the current intensity.

For example, in the embodiment which is illustrated in FIG. 1, the assembly consisting of the hub 4 which carries the rings 16 and the rotary drive motor 10 is rigidly fixed to a vertical rack 24 in meshing relation with a pinion 26 which is driven in rotation by the shaft of a motor 28, said motor being started up or stopped as a function of the distance between the passageway 18 and the part 1 to be cut.

In fact, the circuit which supplies current to said motor 28 comprises an actuating function indicator 30 which is connected to the electrolysis circuit and is consequently responsive to the voltage developed between the rings 16a, 16b and the part 1 to be cut. Thus, said indicator controls the start-up of the motor 28 and initiates its rotation either in one direction or the other according to the value of the voltage referred-to.

The rotation of said motor is accompanied by the rotation of the pinion 26 which causes the displacement of the rack 24 and the assembly consisting of motor 10 and hub 4 either downwards or upwards according to the value of said voltage.

In a preferred embodiment, the indicator 30 has two thresholds which are indicated by positionally-adjustable pointers 31 and 32 corresponding respectively to the minimum and maximum values of the distance between the rings 16 and the part 1 to be cut. As long as the voltage between these two elements remains at a value which is comprised between these two thresholds, the motor 28 is stoped and the hub 4 is simply driven in rotation by the motor 10. However, when the voltage rises between the rings 16 and the part to be cut, that is to say when the space between these two elements increases and exceeds the maximum value corresponding to the pointer 32, the rotation of the motor 28 which produces the downward displacement of the rack 24 reduces said space in such a manner as to permit the continuation of the electrolytic process.

Should the rings 16 be located too near the part 1 to be cut, the motor 28 could similarly raise the assembly of the hub 4 and restore the necessary spacing.

Thus, it is possible to obtain a uniform and continuous cut over a relatively short time without any danger of work-hardening or of local heating of the metal.

The protective oil film can also carry out a partial cooling of the metal.

As is readily understood, the nozzles 22, 23 are preferably also maintained at a constant distance from the part. For example, as shown in FIGS. 2 and 3, said nozzles are fixed at the ends of pipes 34, 35 carried by an arm 36 which is rigidly fixed to a slide 38, both the hub 4 and its drive shaft 8 being carried by said slide.

Said slide 38 is capable of moving along two columns 40 which are fixed on the frame 42 of the apparatus and is also rigidly fixed to a nut 44 (shown in FIG. 2) in which is rotatably fitted a screw 46. Said screw 46 is parallel to the columns 40 and is driven by a pinion 48 in meshing relation with a second pinion 50 driven by a motor 52 which thus controls the displacement of the hub 4 and nozzles 22, 23 parallel to the cut being made in the part. Said motor 52 can be independent and rotate at a speed which is determined beforehand according to the intended cutting speed. Alternatively, as is the case with the motor 28 of FIG. 1, said motor 52 can be operated in dependence on the voltage developed between the passageway 18 and the part 1 so as to maintain constant the distance between these two elements progressively as the cutting operation takes place.

Within the slide 38, the shaft 8 is freely mounted for rotation by virtue of ball-bearings 54. Said shaft terminates in a pinion 56 which forms a bevel drive with a second pinion 58 which is freely mounted for rotation only on the slide 38 and freely mounted for translational motion only on a splined shaft 60 which passes through said second pinion. Said splined shaft is driven by means of pinions 62 from a motor 74 which is fixed in the base of the apparatus in the same manner as the motor 52. The motor 64 and consequently the shaft 60 and pinions 56, 58 rotate alternately in one direction then in the other so as to impart an oscillating motion to the passageway 18.

At the same time, the rotation of the screw 46 causes the displacement of the slide 38, of said passageway 18 and of the nozzles 22, 23 in the direction of the part 1.

The pipes 34, 35 which carry the nozzles 22, 23 are connected by means of bellows elements 66 (as shown in FIG. 3) supported by an arm 67 forming part of the slide 38 to a feed pipe 68 which is in turn connected to a liquid-containing tank 70 placed within the base of the apparatus beneath the support 2. Suction means 74 such as a pump or the like serve to deliver the liquid contained in the tank into the pipe 68 whilst a valve 72 controls the rate of flow of liquid through the nozzles by regulating the quantity of liquid diverted from these latter and returned to the tank 70 via a pipe 73. Pipes for discharging used liquid to said tank 70 are also provided within the support 2 and means of known type (not shown in the drawings) for filtering and separating the liquid from the electrolyte are mounted between the bottom of said tank and the suction means 74.

Similarly, the electrolyte feed pipe 14 is connected by means of an elbowed pipe 76 supported by the slide 38 to an electrolyte reservoir and to means for controlling the continuous delivery of said electrolyte towards the pipe 14. This electrolyte circulation system is not shown in the drawings in order not to complicate the figures, its construction being substantially the same as that of the protective liquid system.

As is the case with the pipes 34 and 35, the pipe 76 is not directly supported by the slide 38 but is mounted above a support 78 provided with two apertures 80 (shown in FIG. 2) terminating in circular orifices, each of which is designed to accommodate one of the pipes 34 and 35. Said orifices have dimensions such that, when the apertures are free, the pipes are capable of sliding parallel to the rings 16a, 16b or of rotating about their axes, thereby making it possible to adjust the positions of the nozzles 22, 23 with respect to the axis of the hub 4 and/or the orientation of the jet produced through said nozzles. Two screws 82 which are clamped by means of nuts 84 close off the apertures 80 and lock the pipes 34, 35 with respect to the support 78.

Said support 78 is rigidly fixed to a rail 86 which is adapted to move in a slideway 88 formed by the arm 36 parallel to the axis of the shaft 8 and of the hub 4. A screw 90 which is screwed in said arm 36 serves to lock the rail 86 and consequently the support 78 and the nozzles 22, 23 when the plane of symmetry of the two nozzles 22, 23 is suitably located in the cutting plane of the rings 16a, 16b, the distance between said nozzles being always constant.

In the embodiment shown in FIG. 3, each nozzle is double and comprises two jets disposed side by side, thereby permitting the formation of a veritable protective wall on each side of the passageway 18.

It is to be understood that a number of different modifications could be made in the form of construction which has just been described without thereby departing from the scope of this invention. In particular, the adjustment of the distance between the electrolyte feed passageway and the part to be cut could be controlled by any other suitable device.

What we claim is:

1. A method of electrolytic cutting consisting of the steps of continuously pouring an electrolyte through a narrow passageway, passing an electric current between said passageway and the part to be cut through said electrolyte, maintaining constant the distance between the passageway and the part progressively as said part is cut, pouring on each side of said passageway a protective liquid which is immiscible with the electrolyte and forms a film on the part for limiting the lateral cutting action of the electrolyte, maintaining constant the distance between the admission of said protective liquid and the part progressively as said part is cut and, at the same time, imparting to said passageway a movement of oscillation above and substantially parallel to the cut of the part thus modifying the flow of the electrolyte in the passageway and maintaining constant the cutting action of the electrolyte.

2. A device in accordance with claim 1, said rings being secured for translational motion to a member which moves in translation at right angles to the part, said member being driven by a motor at a speed which is a function of the distance between the passageway and the part.

3. A device for electrolytic cutting comprising a support for the part to be cut, a member above said support for guiding an electrolyte poured in the direction of said part, an electric circuit providing a connection between said part and said member through the electrolyte, nozzles for continuously supplying a lateral protection liquid in the direction of the part on each side of said member, means for regulating the distance between said member and said nozzles and the part progressively as said part is cut by the electrolyte, two flat rings fixed on said member spaced at a small distance from each other forming a circular passageway parallel to the cut to be made, a hollow hub supporting said flat rings, an opening in the central portion of said hub for the continuous admission of electrolyte which flows through the passageway, a motor for rotating said hollow hub and means for periodically reversing the direction of rotation of said motor and of the passageway above the cut whereby said passageway oscillates substantially parallel to said cut.

4. A device in accordance with claim 2, including an element for controlling the electric voltage between said rings and the part which is mounted in the supply circuit of the motor which regulates the position of the passageway and controls the member which is adapted to move in translation at right angles to the part.

5. A device in accordance with claim 2, including means for centering the nozzles with respect to the passageway.

6. A device in accordance with claim 2, said nozzles being rigidly fixed to the member moving in translation at right angles to the part.

7. A device in accordance with claim 5, including a support for said nozzles moving in a slideway parallel to the axis of said hub and means for locking said support.

8. A device in accordance with claim 6, said nozzles being slidably mounted parallel to said rings on a support, and locking means on said support for said nozzles.

9. A device in accordance with claim 5, said nozzles being orientable about their axes.

References Cited

UNITED STATES PATENTS

| | | | |
|---|---|---|---|
| 3,130,138 | 4/1964 | Faust et al. | 204—143 |
| 3,238,114 | 3/1966 | Halverstadt et al. | 204—224 |
| 3,338,808 | 8/1967 | Johnson | 204—143 |
| 3,371,022 | 2/1968 | Inoue | 204—143 |
| 3,390,068 | 6/1968 | Ellis et al. | 204—224 |
| 3,401,102 | 9/1968 | Stiff | 204—143 |

FOREIGN PATENTS

| | | | |
|---|---|---|---|
| 335,003 | 9/1930 | Great Britain | 204—143 |

ROBERT K. MIHALEK, Primary Examiner

U.S. Cl. X.R.

204—217, 222, 224